United States Patent [19]

van der Molen

[11] Patent Number: 4,808,359
[45] Date of Patent: Feb. 28, 1989

[54] PROCESS FOR THE PREPARATION OF CAST FILM

[75] Inventor: Theodorus J. van der Molen, Vijlen, Netherlands

[73] Assignee: Stamicarbon B.V., Geleen, Netherlands

[21] Appl. No.: 890,606

[22] Filed: Jul. 30, 1986

[30] Foreign Application Priority Data

Aug. 6, 1985 [NL] Netherlands ..................... 8502191

[51] Int. Cl.$^4$ .................. B29C 47/06; B29C 47/86
[52] U.S. Cl. ......................... 264/171; 264/176.1; 264/210.1; 264/216; 425/224
[58] Field of Search ............ 264/216, 176 R, 556, 264/564, 569, 171, 237, 348, 176.1, 210.1; 425/224, 326.1; 428/518

[56] References Cited

U.S. PATENT DOCUMENTS

| | | | |
|---|---|---|---|
| 3,754,067 | 8/1973 | St. Eve et al. | 264/237 |
| 3,920,782 | 11/1975 | Cogswell | 264/237 |
| 4,243,619 | 1/1981 | Fraser et al. | 264/564 |
| 4,282,177 | 8/1981 | Kurtz et al. | 425/326.1 |
| 4,348,349 | 9/1982 | Kurtz | 425/326.1 |
| 4,360,494 | 11/1982 | Kurtz | 425/326.1 |
| 4,394,474 | 7/1983 | McKinney et al. | 264/216 |
| 4,486,377 | 12/1984 | Lucchesi et al. | 425/72 R |
| 4,608,221 | 8/1986 | Kurtz et al. | 425/72 R |

FOREIGN PATENT DOCUMENTS

| | | | |
|---|---|---|---|
| 32629 | 7/1981 | European Pat. Off. | 264/171 |
| 58-104721 | 6/1983 | Japan | 264/171 |
| 58-177324 | 10/1983 | Japan | 264/564 |
| 61-74823 | 4/1986 | Japan | 264/569 |
| 2124139 | 2/1984 | United Kingdom . | |

*Primary Examiner*—Jeffery Thurlow
*Attorney, Agent, or Firm*—Cushman, Darby & Cushman

[57] ABSTRACT

Cast film on the basis of low-density polyethylene is prepared by extruding the molten polymer at temperatures of the melt at the die gap of below 200° C. Films that have been prepared this way have special monoaxial orientation as a result of which the mechanical properties are improved.

16 Claims, No Drawings

PROCESS FOR THE PREPARATION OF CAST FILM

The invention relates to a process for the preparation of cast films from a polymer composition on the basis of low-density polyethylene in which the polymer composition is passed, in molten condition, via an extruder through a rectangular die and is subsequently cooled and wound up, use being made of one or more chill rolls.

Such a process for the preparation of cast film is well known in itself, being described in, for instance, "Petrothene Polyolefins ... a processing guide" (a publication by the National Distillers and Chemical Corporation, 1971, 4th ed.).

Low-density polyethylene cast film is used on a large scale as packaging material. The major requirements to be met by packaging material are in the field of the mechanical properties, such as stiffness, tear resistance, tensile strength, puncture resistance, and the like.

Depending on the application, requirements must often also be met in the field of optical properties, such as low transparency, low opacity and high gloss values.

Film that is to be processed to packaging material, for example, will need to have good tear properties, while in addition its stiffness and tensile strength must be high especially for applications where the film is processed at high speed.

From "Petrothene Polyolefins ... a processing guide" it is known that the best optical properties are obtained when the polymer melt is processed at the highest possible temperatures. A temperature of 280° C. is not exceptional.

The object of the present invention is to provide a process for the preparation of cast film from a polymer composition on the basis of low-density polyethylene that yields a film having good mechanical properties, notably high stiffness and tensile strength, suited for e.g. high speed applications.

This object is achieved by processing the molten polymer composition using a temperature of the melt at the location of the die gap of lower than 200° C.

When processing takes place under conditions according to the invention, special orientation effects surprisingly manifest themselves, imparting good mechanical properties to the film, such as good tensile strength, high stiffness etc. This effect is increased at temperatures of the melt at the location of the die gap of below 180° C., especially below 160° C., and in particular below 150° C.

The orientation effects are expressed as the ratio between intensity maximum and intensity minimum (I max/min) and the angle between the average molecule direction and the extrusion direction ($\alpha$). These are determined by means of X-ray diffraction analysis. For oriented film prepared according to the invention I max/min $\geq$ 20 and $\alpha \leq 20°$, in particular $\geq 50$ and $\leq 15°$, respectively.

The invention also relates to such oriented cast films.

Polymer compositions that are suitable for processing into cast film according to the invention in general contain at least 50% polyethylene homo- and/or copolymer with a low density. Low-density polyethylene is generally understood to mean ethylene homo- or copolymer having a density below 940 kg/m$^3$. The density may be as low as 870 kg/m$^3$, but generally will be above 890 kg/m$^3$, in particular above 900 kg/m$^3$. At a high polar comonomer content, however, the density may increase to more than 940 kg/m$^3$. Low-density polyethylene homopolymer, copolymers of ethylene and one or more C$_3$–C$_{18}$ 1-alkenes as comonomer, copolymers of ethylene with one or more polar comonomers, but also mixtures of polyethylene homo- and/or copolymers or mixtures with, for instance, high-density polyethylene (having a density above of 940 kg/m$^3$) and/or polypropylene can be applied with good results. These mixtures of polyethylene homo- and/or copolymers with high-density polyethylene and/or polypropylene preferably contain at least 70 wt.%, relative to the total polymer, of the low-density polyethylene homo- and/or copolymer. For preparation of film having good optical properties, it is to be recommended to start from copolymer of ethylene with one or more C$_3$–C$_{18}$ 1-alkenes, in particular with a density below 922 kg/m$^3$ or e.g. ethylene-vinyl acetate copolymer or ethylenemethacrylate copolymer.

In addition, various additives may be present, such as stabilizers, lubricants, fillers, colourants, waxes, and the like. If use is made of ethylene copolymer with one or more C$_3$–C$_{18}$ 1-alkenes, fluorocarbonelastomers, for instance, can be added to prevent or suppress melt fracture.

The quantity by weight of additives relative to the quantity by weight of polymer will usually not exceed 20% and preferably not exceed 10%.

The melt index of these polymer compositions, determined according to ASTM D 1238, may have the customary values, for instance between 2 and 100 dg/min. In view of the low processing temperature, however, it is to be recommended to choose a melt index of not lower than 8 dg/min. The advantageous effect on the mechanical properties of low-temperature processing decrease at a melt index above 75 dg/min, and is most pronounced at a melt index of at most 50 dg/min.

The advantage of the invention is that also polymer compositions with a relatively high melt index can be processed into cast film with good mechanical properties.

Another advantage is that highly mono-axially oriented films are obtained without an extension of equipment being necessary. This is illustrated by the substantial increase of the tensile strength in the machine direction.

Cast film is obtained by passing a polymer melt through a rectangular die, followed by cooling via one or more chill rolls and winding. For ethylene processing into cast film, a die gap of 0.2 to 1.5 mm is customary, and this can also be applied in the process according to the invention. Larger die gaps, for instance of 2 or 5 mm, can also be applied, variations in die geometry also being possible. It has been found that the mechanical properties of the film improve if a die gap of at least 2 mm and at most 10 mm, in particular at most 5 mm is used.

In combination with the low processing temperature, these larger die gaps result in even better mechanical properties, notably in good stiffness and tensile strength while the optical properties are also improved.

In many cases packaging film has to satisfy not only requirements relating to the mechanical properties, but also requirements as regards the optical properties. The optical properties of the film improve when a polymer composition is started from that has a melt index of at least 10 dg/min, in particular of at least 14 dg/min.

In the preparation of cast film, use is generally made of a so-called air knife. This serves to improve heat transfer from the film to the chill roll and to prevent air inclusions.

In a process according to the invention the air knife can also be used.

The process according to the invention is suitable especially for the preparation of multilayer products, like multilayer film, extrusion coated and extrusion laminated materials, but can also be used for single-layer film.

The invention will now be elucidated with reference to some examples. It is illustrated that the invention leads to films that have a high stiffness (reflected by a high modulus of elasticity) and high tensile strength and tear resistance, and good optical properties. Thus the mechanical properties of the film are substantially improved without substantial deterioration of the optical properties.

EXAMPLES AND COMPARATIVE EXAMPLES 1 TO 23

Cast film was prepared under conditions as shown in the table. The used polymer compositions were:

A. Ethylene homopolymer with a density of 921 kg/m$^3$ and a melt index of 8.5 dg/min.
B. Ethylene homopolymer with a density of 929 kg/m$^3$ and a melt index of 9 dg/min.
C. Ethylene homopolymer with a density of 931 kg/m$^3$ and a melt index of 10 dg/min.
D. The polymer of C blended with 6% by weight of the total polymer composition of ethylene homopolymer with a density of 962 kg/m$^3$ and a melt index of 11 dg/min.
E. Ethylene homopolymer with a density of 929 kg/m$^3$ and a melt index of 10.5 dg/min.
F. Ethylene homopolymer with a density of 921 kg/m$^3$ and a melt index of 16 dg/min.
G. The polymer of F blended with 3% by weight of the total polymer composition of ethylene-octene copolymer with a density of 903 kg/m$^3$ and a melt index of 3 dg/min.
H. The polymer of F blended with 3% by weight of the total polymer composition of ethylene-octene copolymer with a density of 911 kg/m$^3$ and a melt index of 3 dg/min.

The extrusion device used was a Barmag with a screw diameter of 75 mm and a length/diameter ratio of 27. The length of the rectangular die was 65 cm.

The melt temperature at the die gap was determined by infrared measurement or by means of a thermocouple. The film was subjected to the following determinations:

modulus of elasticity according to ASTM D 1922;
yield strength, E 25 and tensile strength according to ISO R 527 (the yield strength in the machine direction, which is defined as the peak occurring in the force necessary to draw the film, cannot be determined due to absence of the peak; therefore, also Σ 25, the force applied to the film at a draw ratio of 25x, is given);
puncture resistance, determined from the energy required to drive a plunger through the film at a rate of 50 mm/min;
notched tear resistance according to a method derived from DIN 53363, but with the notch in the centre of the film at a drawing rate of 2.5 cm/min; gloss according to ASTM D 523;
opacity according to ASTM D 1003;
transparency according to the Electro Evans Ltd. method.

∥ stands for machine direction,
⊥ for transverse direction.

The X-ray diffraction was measured using CuK α-radiation (50 kV, 35 mA, Ni filter) and a Statton camera. The distance between film sample and photographic plate was 5 cm. The density was measured across the diameters of the annular absorption bands at the meridian direction and at the highest intensity direction. The differences in intensity are determined by scanning, as a function of the refraction angle of the X-ray beam. For the density measurement, use was made of an Enraf Nonius microdensitometer, model 1, and the method described in C. G. Vonk & A. P. Pijpers, Jr. Appln. Cryst., 14, 8, (1981). A correction was applied for amorphous background radiation. The same method was used in European patent application No. 156130. Notes:
1. not measured
2. the notch did not tear further, so that drawing phenomena occurred.
3. because of the high opacity, the value for the transparency cannot be determined in a reliable way.
4. α can be determined reliably only if I max/min ≧ 10.
5. I max/I min 100 is denoted as ∞. This is a consequence of the low value of $I_{min}$.

TABLE

| | comp. ex. 1 | ex. 2 | ex. 3 | comp. ex. 4 | ex. 5 | comp. ex. 6 | ex. 7 | ex. 8 | comp. ex. 9 | ex. 10 | ex. 11 | ex. 12 |
|---|---|---|---|---|---|---|---|---|---|---|---|---|
| Polymer composition | A | A | A | A | A | B | B | B | C | C | C | C |
| temperature of melt, °C. | 231 | 150 | 152 | 205 | 144 | 231 | 165 | 142 | 230 | 152 | 142 | 142 |
| slot width, mm | 0.5 | 1.5 | 1.5 | 0.5 | 1.5 | 0.5 | 3 | 2 | 0.5 | 3 | 2 | 2 |
| film thickness, μm | 30 | 30 | 30 | 25 | 30 | 30 | 35 | 30 | 30 | 30 | 35 | 35 |
| output, kg/hr | 60 | 60 | 60 | 20 | 20 | 60 | 60 | 60 | 60 | 60 | 60 | 60 |
| air knife temperature, °C. | 25 | 25 | none | 25 | none | 25 | none | 5 | 25 | none | 5 | none |
| modulus of elasticity, N/mm$^2$ | | | | | | | | | | | | |
| ∥ | 108 | 240 | 166 | 136 | 183 | 152 | 235 | 380 | 175 | 265 | 311 | 299 |
| ⊥ | 115 | 195 | 174 | 139 | 172 | 152 | 225 | 272 | 172 | 276 | 283 | 285 |
| yield strength, N/mm$^2$ | | | | | | | | | | | | |
| ∥ | — | — | — | — | — | — | — | — | — | — | — | — |
| ⊥ | 7.5 | 9.5 | 8.5 | 7 | 9 | 9 | 13.5 | — | 10.5 | 14 | — | — |
| Σ 25, N/mm$^2$ | | | | | | | | | | | | |
| ∥ | 8.5 | 34 | 23 | 9.5 | 22.5 | 12 | 19.5 | 45 | 11.5 | 20.5 | 34 | 17 |
| ⊥ | 7.5 | 8 | 7.5 | 7 | 8 | 8.5 | 9 | — | 9 | 10.5 | 9.5 | 11 |
| puncture resistance, J/m | 827 | 721 | 664 | 574 | 676 | 365 | 237 | 235 | 249 | 119 | 95 | 89 |
| notched tear resistance, kJ/m$^2$ | | | | | | | | | | | | |
| ∥ | 2.64 | 330 | 302 | 308 | 316 | 313 | 317 | 421 | 303 | 252 | 276 | 304 |

TABLE-continued

| ⊥ tensile strength, N/mm² | 95 | 62² | 264² | 110 | 123² | 131 | 141 | 33 | 136 | 140 | 41 | 191 |
|---|---|---|---|---|---|---|---|---|---|---|---|---|
| ∥ | 18.5 | 49.5 | 41 | 22 | 40.5 | 23 | 39.5 | 49 | 18 | 39 | 45 | 39 |
| ⊥ | 10.5 | 8 | 8 | 14 | 7.5 | 13 | 6.5 | 13.5 | 13.5 | 9 | — | 13 |
| gloss, %₀₀ | 82 | 47 | 61 | 90 | 61 | 79 | 63 | 47 | 73 | 62 | 41 | 52 |
| opacity, % | 2.3 | 10.5 | 5.5 | 1.1 | 5.5 | 3.8 | 7 | 15 | 4.4 | 6.7 | 16 | 11 |
| transparency, EEL | 7 | 19 | 10.5 | 3 | 15 | 7.5 | 14 | 19 | 11 | 8 | n.r.d.³ | 13 |
| I max/min | 1.5 | ∞ | ∞ | 2.1 | ∞ | 1.8 | ∞ | ∞ | 3.2 | ∞ | ∞ | ∞ |
| α, degrees | 0⁴ | 0 | 16 | 0⁴ | 14 | 0⁴ | 20 | 0 | 14⁴ | 20 | 13 | 20 |

|  | ex. 13 | ex. 14 | comp. ex. 15 | ex. 16 | ex. 17 | comp. ex. 18 | ex. 19 | ex. 20 | comp. ex. 21 | ex. 22 | ex. 23 |
|---|---|---|---|---|---|---|---|---|---|---|---|
| Polymer composition | D | E | F | F | F | G | G | G | H | H | H |
| temperature of melt, °C. | 143 | 151 | 232 | 145 | 145 | 232 | 145 | 143 | 231 | 145 | 143 |
| slot width, mm | 2 | 1.5 | 0.5 | 3 | 2 | 0.5 | 3 | 2 | 0.5 | 3 | 2 |
| film thickness, μm | 35 | 30 | 30 | 35 | 30 | 30 | 30 | 30 | 30 | 30 | 30 |
| output, kg/hr | 60 | 60 | 60 | 60 | 60 | 60 | 60 | 60 | 60 | 60 | 60 |
| air knife temperature, °C. | none | none | 25 | none | none | 25 | none | none | 25 | none | 25 |
| modulus of elasticity, N/mm² |  |  |  |  |  |  |  |  |  |  |  |
| ∥ | 312 | 245 | 117 | 161 | 182 | 104 | 189 | 231 | 103 | 188 | 238 |
| ⊥ | 365 | 278 | 121 | 160 | 178 | 107 | 173 | 174 | 107 | 168 | 194 |
| yield strength, N/mm² |  |  |  |  |  |  |  |  |  |  |  |
| ∥ | — | — | — | — | — | — | — | — | — | — | — |
| ⊥ | — | 12.5 | 7.5 | 9 | 9 | 7 | 7.5 | 9 | 7 | 8.5 | 9 |
| Σ 25, N/mm² |  |  |  |  |  |  |  |  |  |  |  |
| ∥ | 22.5 | 26 | 8 | 22.5 | 17.5 | 8 | 19 | 26 | 8 | 18.5 | 19.5 |
| ⊥ | — | 10 | 7 | 8 | 7.5 | 7 | 6 | 7.5 | 7 | 7.5 | 7.5 |
| notched tear resistance, kJ/m² |  |  |  |  |  |  |  |  |  |  |  |
| ∥ | 329 | 331 | 217 | 322 | 312 | 240 | 319 | 324 | 232 | 308 | 328 |
| ⊥ | 216 | 80² | 81 | 183 | 369 | 94 | 241 | 194 | 103 | 318 | 134 |
| tensile strength, N/mm² |  |  |  |  |  |  |  |  |  |  |  |
| ∥ | 42.5 | 42 | 15.5 | 42 | 32.5 | 16.5 | 36.5 | 41.5 | 17 | 38 | 43 |
| ⊥ | 14.5 | 9 | 8 | 9.5 | 10.5 | 12 | 8.5 | 9.5 | 11.5 | 6.5 | 7 |
| gloss, %₀₀ | 55 | 45 | 92 | 71 | 71 | 92 | 76 | 73 | 92 | 77 | 59 |
| opacity, % | 9.4 | 10.6 | 0.9 | 4.7 | 4.4 | 1.2 | 5 | 4.6 | 1.1 | 3.9 | 7.3 |
| transparency, EEL | 14 | 19.5 | 4.5 | 6 | 5.5 | 3.8 | 4.5 | 8 | 7 | 3 | 10 |
| I max/min | n.m.¹ | ∞ | 2.0 | ∞ | ∞ | 2.1 | ∞ | ∞ | 2.0 | ∞ | ∞ |
| α, degrees | n.m.¹ | 19 | 0⁴ | 18 | 20 | 0⁴ | 20 | 14 | 0⁴ | 19 | 14 |

I claim:

1. Process for the preparation of cast highly monoaxially oriented film comprising the steps of:
   (a) melting a polymer feed composition of low density polyethylene having a melt index of from 2 to 100 dg/min;
   (b) extruding said molten polymer feed composition through a die gap of 1.5-10 mm in a rectangular die, the temperature of said polymer feed composition at the die being less than 200° C.; and
   (c) thereafter cooling said extruded composition to solidify the polymer;
wherein said film exhibits an x-ray diffraction analysis of the 110 reflection band having a max/min intensity ratio of at least 20, and an angle α of at most 20° between the average orientation direction of the polymer molecules and the film extrusion direction.

2. Process of claim 1 wherein the temperature of the feed composition at the die is less than 180° C.

3. Process of claim 2 wherein the temperature of said feed composition at the die is less than 160° C.

4. Process of claim 1 wherein said polymer feed composition has a melt index of from 8 to 75 dg/min.

5. Process of claim 4 wherein said polymer feed composition has a melt index of from 10 to 50 dg/min.

6. Process of claim 1 wherein the die gap width is from 2 mm to 5 mm.

7. Process of claim 1 wherein the polymer feed composition is ethylene homopolymer.

8. Process of claim 1 wherein the polymer feed composition is a copolymer of ethylene and one or more comonomers.

9. Process of claim 1 wherein the polymer feed composition is a copolymer of ethylene with one or more 1-alkenes having 3-18 carbon atoms.

10. Process of claim 9 wherein the polymer feed composition is a copolymer of ethylene with one or more 1-alkenes having 6-12 carbon atoms.

11. Process of claim 9 wherein the polymer feed composition has a density of less than 922 kg/m³.

12. Process of claim 9 wherein said polymer feed composition is a copolymer selected from the group consisting of (i) ethylene and vinyl acetate and (ii) ethylene and methacrylate.

13. Process of claim 1 wherein the cooled polymer forms a multilayer film.

14. Process of claim 1 wherein the ethylene polymer feed composition comprises at least 50% by weight of an ethylene homopolymer or copolymer having a density of less than 940 kg/m³.

15. Process of claim 14 wherein the ethylene polymer feed composition comprises a blend of at least 50% by weight polyethylene homopolymer or polyethylene copolymer having a density of less than 940 kg/m³ with a member of the group consisting of:
   (i) low density polyethylene homopolymer;
   (ii) copolymers of ethylene and one or more 1-alkenes having from 3-18 carbon atoms;
   (iii) copolymers of ethylene with one or more polar comonomers;
   (iv) polyethylene having a density of more than 940 kg/m³; and
   (v) polypropylene.

16. Process for the preparation of cast highly oriented film comprising the steps of:

(a) melting a polymer feed composition of low density polyethylene;

(b) extruding said molten polymer feed composition through a die gap of from 2–5 mm in a rectangular die, the temperature of said polymer feed composition at the die being less than 165° C.; and (c) thereafter cooling said extruded polymer composition to solidify the polymer; wherein said film exhibits an x-ray diffraction analysis of the 110 reflection band having a max/min intensity ratio of at least 20 and an angle $\alpha$ of at most 20° between the average orientation direction of the polymer molecules and the film extrusion direction.

* * * * *

UNITED STATES PATENT AND TRADEMARK OFFICE
CERTIFICATE OF CORRECTION

PATENT NO. : 4,808,359

DATED : February 28, 1989

INVENTOR(S) : Theodorus J. VAN DER MOLEN

It is certified that error appears in the above-identified patent and that said Letters Patent is hereby corrected as shown below:

Column 2, line 19, please correct "ethylenemethacrylate" to read --ethylene-methacrylate--;

column 4, line 21, "gloss according to ASTM D 523;" should be on a new line;

table, comp. ex. 1, "2.64" should be --264--.

Signed and Sealed this

Fifth Day of December, 1989

Attest:

JEFFREY M. SAMUELS

Attesting Officer     Acting Commissioner of Patents and Trademarks

UNITED STATES PATENT AND TRADEMARK OFFICE
CERTIFICATE OF CORRECTION

PATENT NO. : 4,808,359

DATED : February 28, 1989

INVENTOR(S) : Theodorus J. Van Der Molen

It is certified that error appears in the above-identified patent and that said Letters Patent is hereby corrected as shown below:

Column 4, line 49, "$I_{min}$" should read --$I\ min$--.

Signed and Sealed this

Third Day of July, 1990

*Attest:*

HARRY F. MANBECK, JR.

*Attesting Officer*      *Commissioner of Patents and Trademarks*